Dec. 23, 1969    R. F. COOPER ET AL    3,485,700
TIRE BUILDING DRUM
Filed July 20, 1966    2 Sheets-Sheet 2

INVENTORS
RALPH F. COOPER
COURTNEY H. WENGER
BY Joseph Januszkiewicz
ATTY.

United States Patent Office 3,485,700
Patented Dec. 23, 1969

3,485,700
TIRE BUILDING DRUM
Ralph F. Cooper, 501 Orlando Ave., Akron, Ohio
44320, and Courtney H. Wenger, 2053 24th St.,
Cuyahoga Falls, Ohio 44221
Filed July 20, 1966, Ser. No. 566,509
Int. Cl. B29h *17/16*
U.S. Cl. 156—417
1 Claim

ABSTRACT OF THE DISCLOSURE

A cylindrical drum comprising alternating long and short arcuate segments each connected by a guide rod slidable in a radial bore in an annular ring on a sleeve which is in turn fixed on the axial shaft, a hollow control shaft mounted for rotation on one end of said sleeve, all the segments having levers linking to a flange on said sleeve, the shorter segments being linked to pivots on said flange at a greater radial distance from the axis than the pivots of the longer segments, and the pivots on the flange for the longer segments being offset from the radial line extending from the axis to the pivots on said longer segments to provide self-locking means for said drum sections.

---

This invention relates to a tire building drum and more particularly to a collapsible tire building drum upon which pneumatic tire casings are fabricated.

In the construction of a green tire carcass, a plurality of fabric plies of material in superposed relationship are assembled on a cylindrical drum mounted to rotate about a horizontal axis. The width of the drum is somewhat less than the width of the plies of material so that the edge portions of the material extend past the edges of he drum, which edge portions are tuned inwardly against the sides thereof, preparatory to the application of the beads. Endless inextensible tire beads which are smaller in diameter than the expanded drum are then applied to the inwardly extending portions of the fabric plies after which the plies are turned up over the beads.

In the use of such inextensible beads, it is necessary that the drum be collapsed so that the outer diameter of the collapsed drum is less than the diameter of the inextensible beads to permit removal of the tire from the drum. Although various forms of collapsible drums have been devised, some of these forms are complex in construction requiring considerable maintenance to assure proper working condition. Others are devised for complex movement to provide maximum collapsing action. The use of bladders does not provide a sufficiently rigid surface for the stitching of the plies.

The general purpose of this invention is to provide for a collapsible building drum that is simple in construction, easy to manufacture and maintain, and yet effective to support the green tire carcass for the fabrication thereof.

The present invention contemplates the use of a single actuating means which controls plural sets of annularly disposed segments which define an outer shell of a tire building drum. The alternate segments are moved radially inwardly to facilitate the radial inward movement of the remaining alternate segments which in the collapsed condition facilitate the removal of the green tire carcass.

An object of this invention is to provide a new and improved collapsible tire building drum. Another object of this invention is to provide a collapsible tire building drum which is simple in construction and economical to manufacture. A further object of this invention is to provide a collapsible tire building drum, the periphery of which can be reduced to facilitate the removal of a tire carcass built thereon. A further object of this invention is to provide a tire building drum whose outer segments which define the shell are interchangeable to permit different size tires to be built thereon. These and other objects and advantages will appear more fully in the following detailed description and considered in connection with the following drawings in which:

Figure 1:
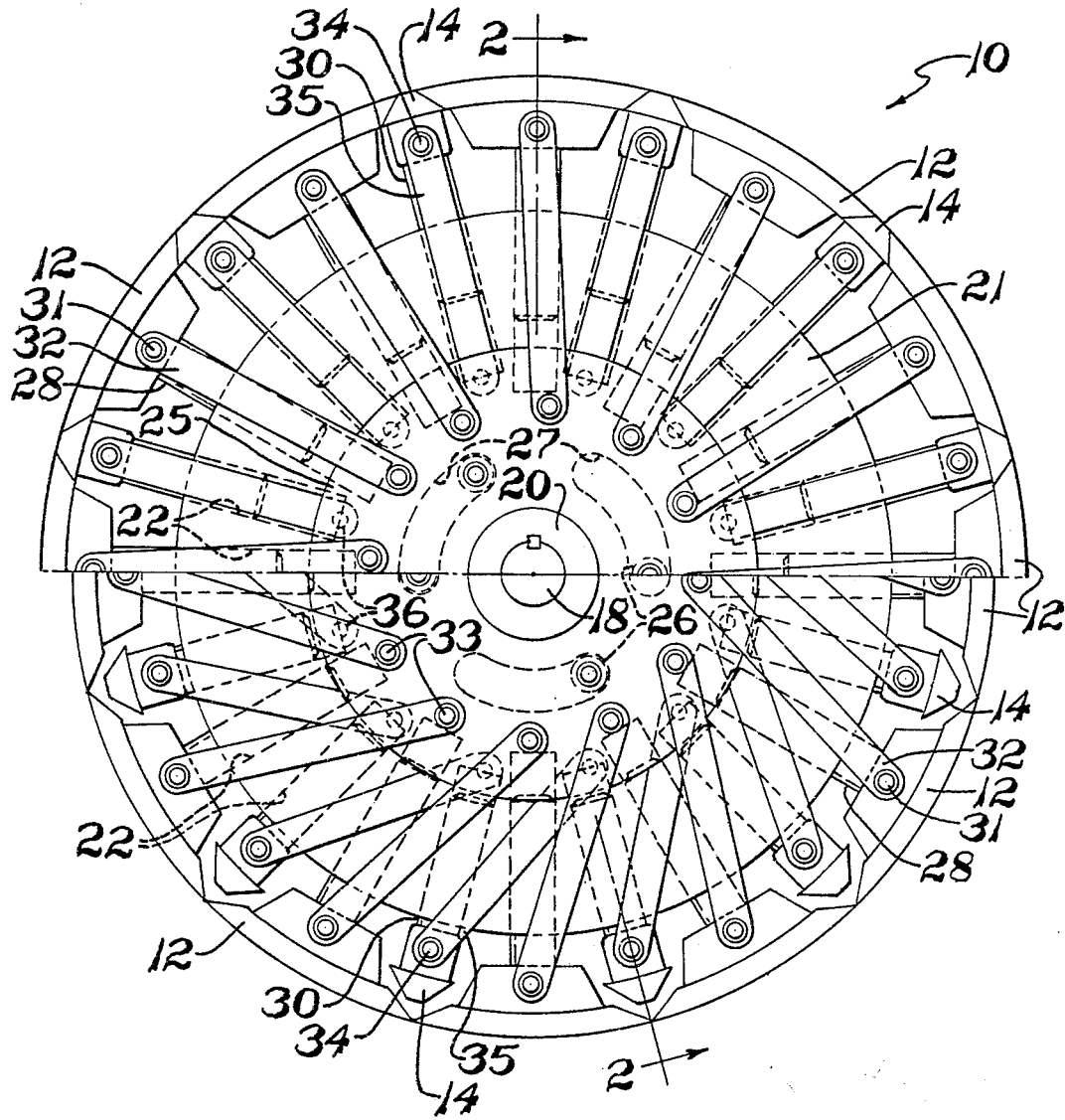
FIG. 1 is a side elevational view of the tire building drum, showing one half of the drum in expanded condition and the other half of the drum in the collapsed condition.

Referring now to the drawings wherein like reference characters designate like or corresponding parts throughout the several views, there is shown in FIG. 1 a tire building drum indicated generally as 10 embodying the present invention comprising a cylindrical outer shell which provides support for the assembly of the various components and plies of material which form an unvulcanized passenger tire band for a green tire carcass. Such tire carcass generally comprises a plurality of rubberized fabric plies which are assembled on the drum to form the tire body. The ends of the plies in the assembly process are turned radially downward over the shoulders of the drum, an inextensible wire bead is then anchored to the respective side portions of the turned-down plies, after which the plies of fabric are wrapped over the inextensible beads and secured to the other portion of the rubberized fabric plies. The sidewalls and tread portions are then applied to complete the tire band which is then removed, shaped and vulcanized into a finished tire.

Upon completion of the green tire carcass or tire band, the drum 10 must be collapsed to a smaller diameter to facilitate the removal of the green tire carcass from the drum without distorting or injuring the inner bead such that the band or green tire carcass may be slipped from the drum for subsequent vulcanizing operations.

Figure 2:
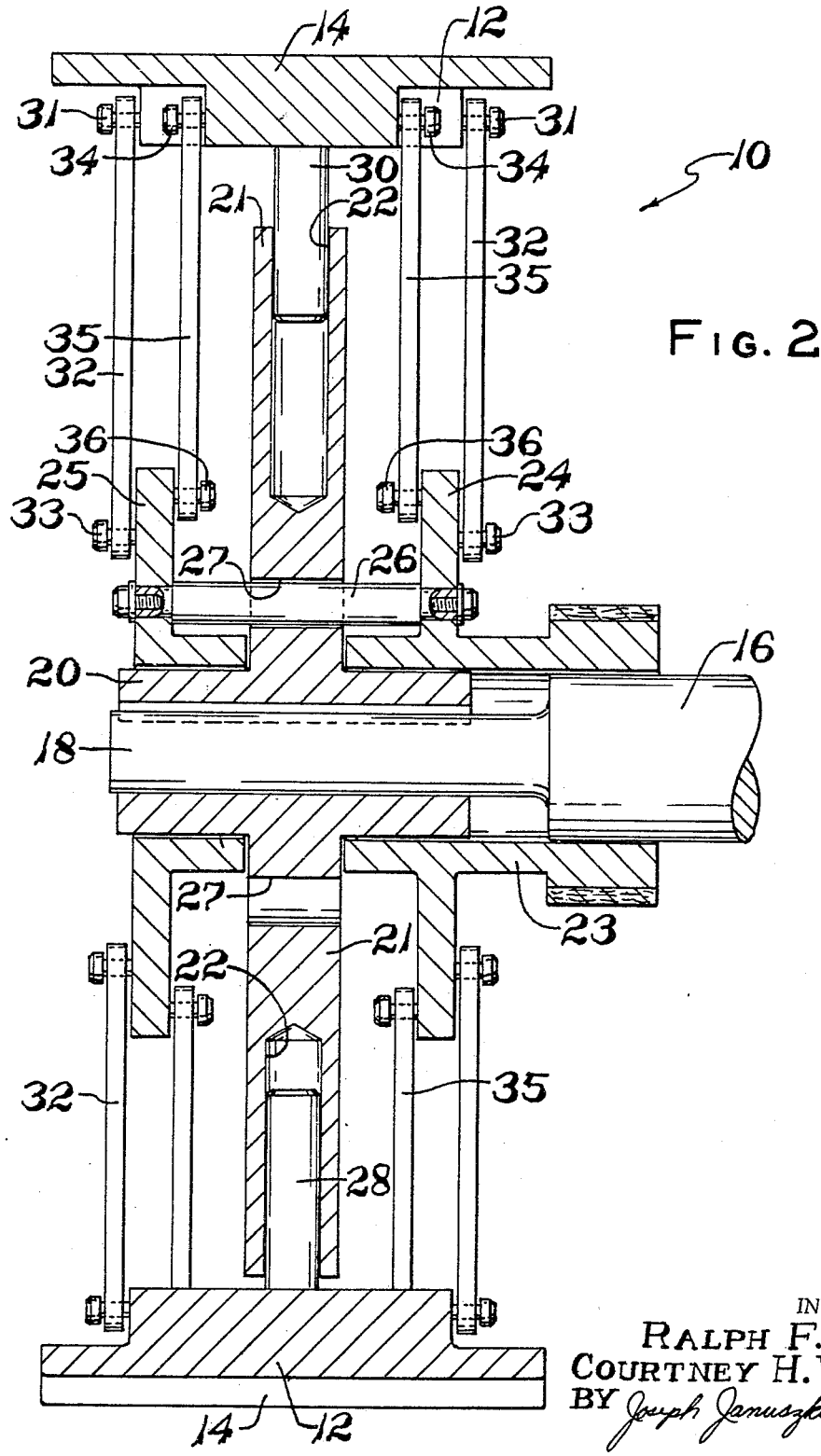
FIG. 2 is a cross sectional view taken along line 2—2 of FIG. 1.

The drum 10 comprises an outer shell formed of 24 segmental portions consisting of twelve large sections or segments 12 alternating respectively with twelve smaller segments 14. The large segments extend over approximately 336° of the outer periphery of the drum while the smaller segments extend over approximately 24° of the outer periphery of the drum. The drum has a hub 16 on one end of shaft 18 which is supported and driven by a suitable drive means, the details of which form no part of this invention. Mounted on the shaft 18 is a sleeve 20 that is suitably keyed to such shaft 18 for rotation therewith. The intermediate portion of the sleeve 20 has a radially outwardly extending annular ring portion which ring portion 21 has a plurality of radially extending bores 22. Mounted on hub 16 is a tubular control shaft 23 which is operatively connected to a pair of spaced annular flanges 24 and 25, which flanges 24 and 25 are rotatably mounted on the respective outer portions of sleeve 20, as shown in FIG. 2. The respective flanges 24 and 25 are interconnected by studs 26 which extend through arcuate slots 27 in the annular ring portion 21 thereby permitting movement between the tubular control shaft 23, the flanges 24 and 25 relative to the annular ring portion 21. The large segments 12 have radially inwardly extending guide rods 28 which guide rods are slidably received by the bores 22 of the annular ring portion 21. The respective small segments 14 have radially inwardly extending guide rods 30, which guide rods 30 are received by the remaining bores 22 of the annular ring portion 21. Each large segment 12 is pivotally connected as at 31, 31 to the one ends of a pair of axially spaced levers 32, which levers 32 have their other ends pivotally connected as at 33, 33 to the flanges 24 and 25, respectively (FIG. 2). Each small segment 14 is pivotally connected as at 34, 34 to the one ends of a pair of axially spaced levers 35, which levers 35 have their other ends pivotally connected as at 36, 36 to the flanges 24 and 25, respectively.

The pivotal connection 33 of each lever 32 is off center from a radial line drawn to the pivot connection 31 from the center of the shaft 18 such that the lever 32 provides a locking action as more fully described hereinafter. In the operation of the tire building drum, assuming the tire building drum is in the expanded condition as shown in the upper portion of FIG. 1, the respective alternating segments 12 and 14 define a cylindrical continuous shell with the respective segments locked in position. When it is desired to remove a finished tire from a drum the tubular control shaft 23 is rotated in a counterclockwise direction relative to shaft 18 which rotates flanges 24 and 25 similarly in a counterclockwise direction thereby rotating the respective pivot connections 33 and 36. Since the pivot connections 36 are disposed outwardly a greater distance from the center line of tubular control shaft 23 than pivot connections 33, such pivot connections 36 move a greater distance than pivot connections 33 such that initially the levers 35 actuate the smaller segments 14 into a radially inward movement while the larger segments 12 remain in their outermost position shown in FIG. 1 of the upper portion of the drawing. In addition, movement of the pivotal connections 33 performs the operation of unlocking the levers 32 which are beyond the radial line extending from the center of shaft 18 to pivot connection 31. Continued counterclockwise rotation of flanges 24 and 25 move the small segments 14 radially inward a sufficient distance to provide clearance space for movement of the large segments 12 which begin their movement in response to the further actuation of levers 32. The collapse of the drum is completed as shown in the lower portion of FIG. 1 wherein the smaller segments are moved a greater distance than the larger segments 12, wherein the larger segments 12 define an outer shell which is smaller in diameter than the original expanded drum as seen in the upper portion of FIG. 1. Such clearance is sufficient to facilitate the removal of the green tire carcass without distortion or breakage of the bead.

In expanding the tire building drum, the procedure is reversed and it will be noted that upon rotation of the flanges 24 and 25 in a clockwise direction as viewed in FIG. 1, the pivotal connections 33 move beyond the radial line connecting the center of the shaft 18 with the respective pivotal connection 31 of the levers 32. Such action locks the drum segments 14 and 12 in abutting contact defining an expanded tire building form. All movements of the segments 12 and 14 are in radial directions as dictated by the guide rods 28 and 30 slidably received by the respective bores 22.

Suitable means is provided to effect relative movement between the shaft 16 and the sleeve 23. Either ball detents may be used to turn the shaft 16 and the sleeve 23 together with suitable braking and actuating means to positively drive the sleeve and brake the shaft or suitable clutching means may be utilized to drive the respective parts selectively or together. These means are old and well known in the art and a further description of them is not seen necessary. See U.S. Patents 3,077,918; 1,877,746 and 2,132,834.

The respective segments 12 and 14 may be replaced with segments defining a larger diameter. However, the movements are duplicated thereby facilitating the adaptation or use in the building of various sizes and widths of tires.

Modifications may be resorted to without departing from the spirit of the invention or scope of the appended claims.

We claim:
1. A tire building drum comprising: a rotatable shaft, a sleeve secured to said shaft for rotation therewith, the intermediate portion of said sleeve having an annular ring extending outwardly therefrom, said annular ring having a plurality of circumferentially spaced bores extending radially inwardly towards the axis of rotation of said shaft, said annular ring having a pair of arcuate slots, a hollow control shaft mounted on one end portion of said sleeve for rotation relative thereto, said control shaft having an annular flange extending outwardly from its intermediate portion, an annular flange mounted on the other end portion of said sleeve, stud means interconnecting said annular flanges to provide simultaneous rotation of said flanges, a plurality of drum sections circumferentially encompassing said annular ring, each of said drum sections having a radially inwardly extending guide rod received by one of said radially extending bores to guide said drum section along a radial line toward and away from said axis of rotation of said shaft, each of said drum sections having the one end portions of a pair of spaced levers pivotally connected to the respective side portions thereof, the other end portions of each lever is pivotally connected to one of said flanges, all of said pivotal connections of said one end portions of said levers lying equidistant from said axis, said other end portions of said levers of alternate drum sections lying on a circle whose radius is lesser than the radius defined by the remaining of said pivotal connections of said other end portions of said levers, and said other end portions of said levers of said alternate drum sections being offset from the radial line extending from the center of said axis to said one end portions of said levers to provide a self-locking means for said drum sections.

References Cited

UNITED STATES PATENTS

| | | | |
|---|---|---|---|
| Re. 22,369 | 8/1943 | Bostwick | 156—420 |
| 1,470,889 | 10/1923 | Steinle | 156—420 X |
| 1,669,532 | 5/1928 | Myers | 156—420 |
| 2,132,834 | 10/1938 | Stevens et al. | 156—420 |
| 2,655,977 | 10/1953 | Hodgkins | 156—420 |
| 3,293,102 | 12/1966 | Held | 156—420 |

JOHN T. GOOLKASIAN, Primary Examiner

C. B. COSBY, Assistant Examiner

U.S. Cl. X.R.

156—420